United States Patent
Igarashi

(10) Patent No.: US 8,522,081 B2
(45) Date of Patent: Aug. 27, 2013

(54) MICROCOMPUTER OUTPUTTING FAILURE DETECTION RESULT

(75) Inventor: Toshiyuki Igarashi, Yokohama (JP)

(73) Assignee: Fujitsu Semiconductor Limited, Yokohama (JP)

(*) Notice: Subject to any disclaimer, the term of this patent is extended or adjusted under 35 U.S.C. 154(b) by 134 days.

(21) Appl. No.: 13/102,158

(22) Filed: May 6, 2011

(65) Prior Publication Data

US 2011/0209006 A1 Aug. 25, 2011

Related U.S. Application Data

(63) Continuation of application No. PCT/JP2008/070669, filed on Nov. 13, 2008.

(51) Int. Cl.
*G06F 11/00* (2006.01)
(52) U.S. Cl.
USPC ............................................ 714/30; 712/204
(58) Field of Classification Search
USPC .......................................................... 714/30
See application file for complete search history.

(56) References Cited

U.S. PATENT DOCUMENTS

| | | | |
|---|---|---|---|
| 5,408,645 A | 4/1995 | Ikeda et al. | |
| 7,461,303 B2 * | 12/2008 | Dart et al. | 714/54 |
| 2002/0007451 A1 * | 1/2002 | Cho et al. | 712/43 |
| 2009/0019276 A1 * | 1/2009 | Song et al. | 713/2 |
| 2009/0235052 A1 * | 9/2009 | Kudo | 712/205 |
| 2011/0063315 A1 * | 3/2011 | Ghosh | 345/536 |

FOREIGN PATENT DOCUMENTS

| | | |
|---|---|---|
| JP | 01-140350 | 6/1989 |
| JP | 05-002654 | 1/1993 |
| JP | 05-035892 | 2/1993 |
| JP | 05-189255 | 7/1993 |
| JP | 10-161908 | 6/1998 |
| JP | 11-015699 | 1/1999 |
| JP | 2001-188688 | 7/2001 |

OTHER PUBLICATIONS

International Search Report for PCT/JP2008/070669, Mailed Dec. 16, 2008.
English Translation of the International Preliminary Report on Patentability issued Jun. 30, 2011 in corresponding International Patent Application No. PCT/JP2008/070669.

* cited by examiner

*Primary Examiner* — Kamini Patel
(74) *Attorney, Agent, or Firm* — Staas & Halsey LLP

(57) ABSTRACT

When a CPU executes a failure detection program, the CPU causes a program counter expected value register to store an expected value of an address which is stored in a program counter after a detection time passes from the start of execution of the failure detection program, and causes a detection time counter to start counting of the detection time. When the detection time counter finishes counting of the detection time, the first comparator outputs as a failure detection result a result of comparison between the address stored in the program counter and the expected value stored in the program counter expected value register.

6 Claims, 5 Drawing Sheets

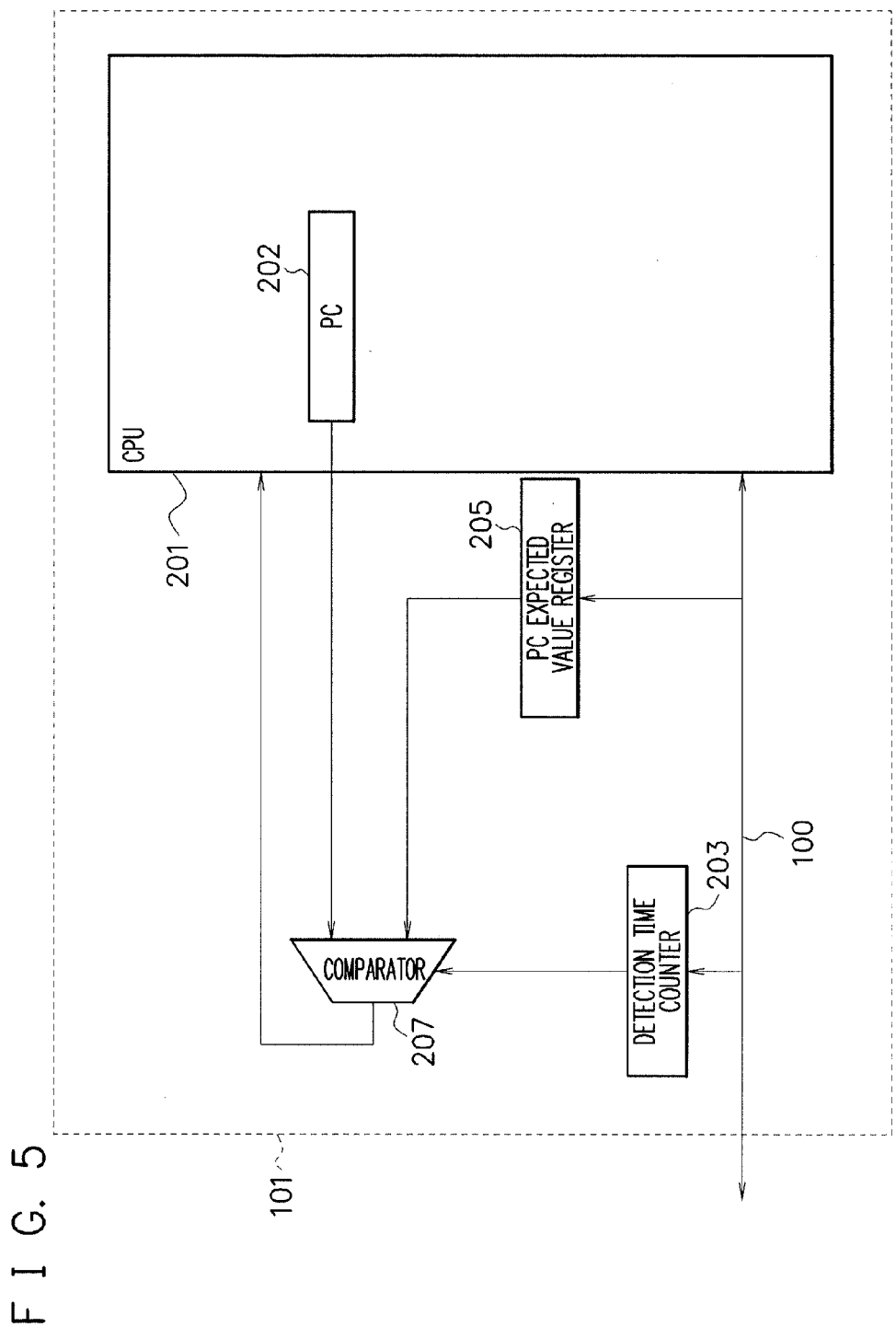
F I G. 5

MICROCOMPUTER OUTPUTTING FAILURE DETECTION RESULT

CROSS-REFERENCE TO RELATED APPLICATION

This application is a Continuation of International Application No. PCT/JP2008/070669, with an international filing date of Nov. 13, 2008, which designating the United States of America, the entire contents of which are incorporated herein by reference.

FIELD

The present embodiments relate to a microcomputer.

BACKGROUND

In recent years, it is desired that failure detection be performed in an LSI for automobile to prevent a failure of the system before causing a serious accident. As a function to detect a failure, watchdog timers are well known. Use of a watchdog timer is such that a CPU periodically clears the timer, and if the timer overflows, it is determined that the CPU has failed. However, the watchdog timer does not detect a failure of the CPU directly, and thus there is a possibility of overlooking a failure.

There is also a measure such that a calculation for detection is performed and a calculation result is checked. However, when a problem occurs in a circuit controlling the flow of instructions, the program for detection may freeze when it is executed, and there is a possibility that the calculation result is not obtained.

Further, Japanese Laid-open Patent Publication No. H05-2654 discloses a failure detection method for microcomputer aiming at improving a failure detection probability in a microcomputer by using a simple structure and further reducing the time from occurrence of a failure to detection of the failure.

Moreover, Japanese Laid-open Patent Publication No. 2001-188688 discloses a freeze detection circuit for microcomputer aiming at detecting processing of an erroneous code.

Patent document 1: Japanese Laid-open Patent Publication No. H05-2654

Patent document 2: Japanese Laid-open Patent Publication No. 2001-188688

SUMMARY

A microcomputer of the present embodiments includes: a CPU including a program counter updating and storing an address of an instruction of a program to be executed next each time an instruction of the program is executed, the CPU executing instructions of the program at addresses stored in the program counter in order; a program counter expected value register storing an expected value of an address stored in the program counter; a first comparator comparing the address stored in the program counter with the expected value stored in the program counter expected value register; and a detection time counter performing counting of a detection time, in which when the CPU executes a failure detection program, the CPU causes the program counter expected value register to store the expected value of the address which is stored in the program counter after the detection time passes from the start of execution of the failure detection program, and causes the detection time counter to start counting of the detection time, and in which when the detection time counter finishes counting of the detection time, the first comparator outputs as a failure detection result a result of comparison between the address stored in the program counter and the expected value stored in the program counter expected value register.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF DRAWINGS

FIG. 5 is a block diagram illustrating a structural example of a microcomputer according to a second embodiment.

DESCRIPTION OF EMBODIMENTS

Figure 1:
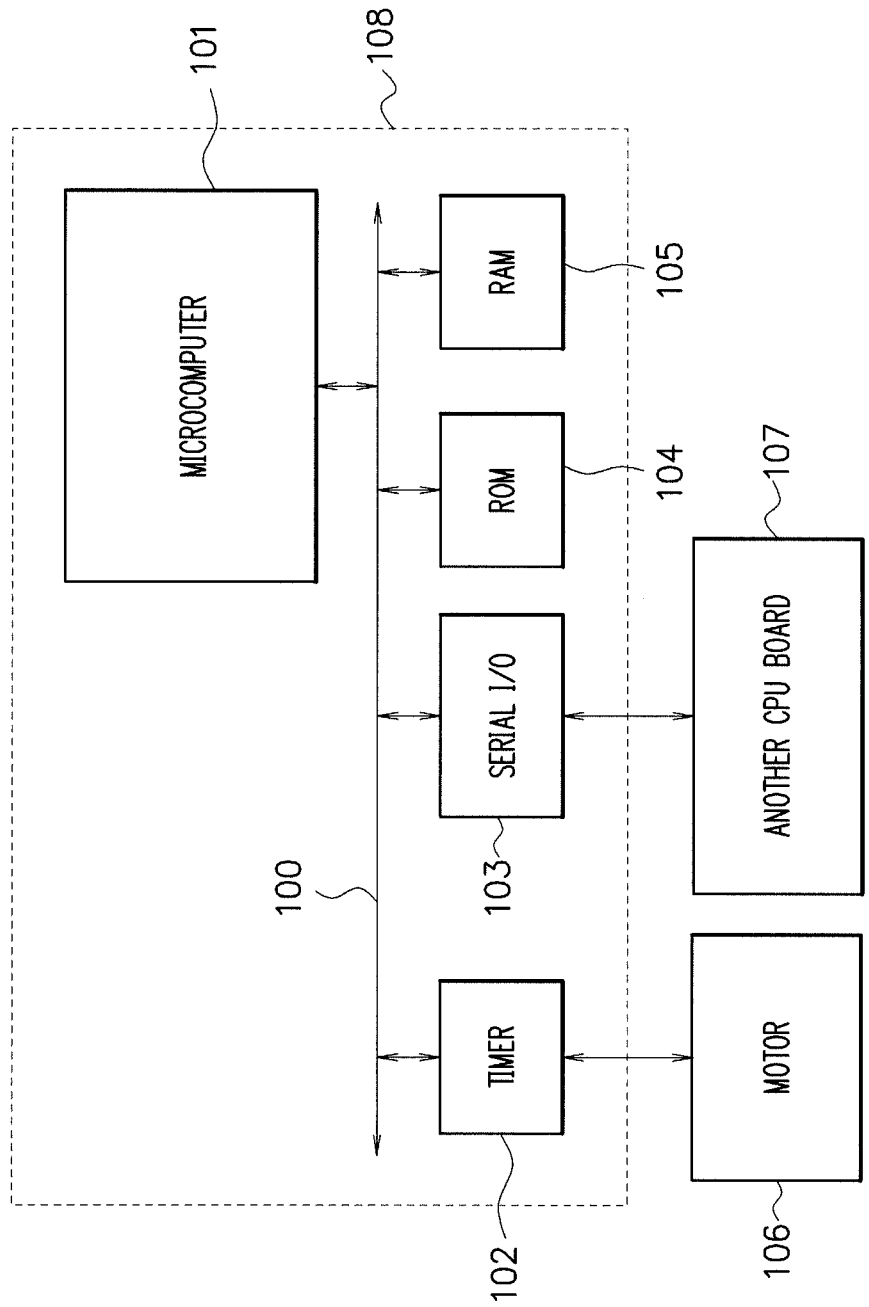
FIG. 1 is a block diagram illustrating a structural example of a microcomputer system according to a first embodiment.

FIG. 1 is a block diagram illustrating a structural example of a microcomputer system according to a first embodiment. The microcomputer system has a CPU board 108, a motor 106, and another CPU board 107. The CPU board 108 has a bus 100, a microcomputer 101, a timer 102, a serial input/output interface 103, a ROM 104, and a RAM 105. The microcomputer 101, the timer 102, the serial input/output interface 103, the ROM 104, and the RAM 105 are connected to the bus 100. The motor 106 is connected to the timer 102. The CPU board 107 has a structure similar to that of the CPU board 108, and is connected to the serial input/output interface 103. The ROM 104 or the RAM 105 stores a failure detection program. The microcomputer 101 is able to detect a failure of a CPU in the microcomputer 101 by reading out and executing the failure detection program in the ROM 104 or the RAM 105.

Figure 2:
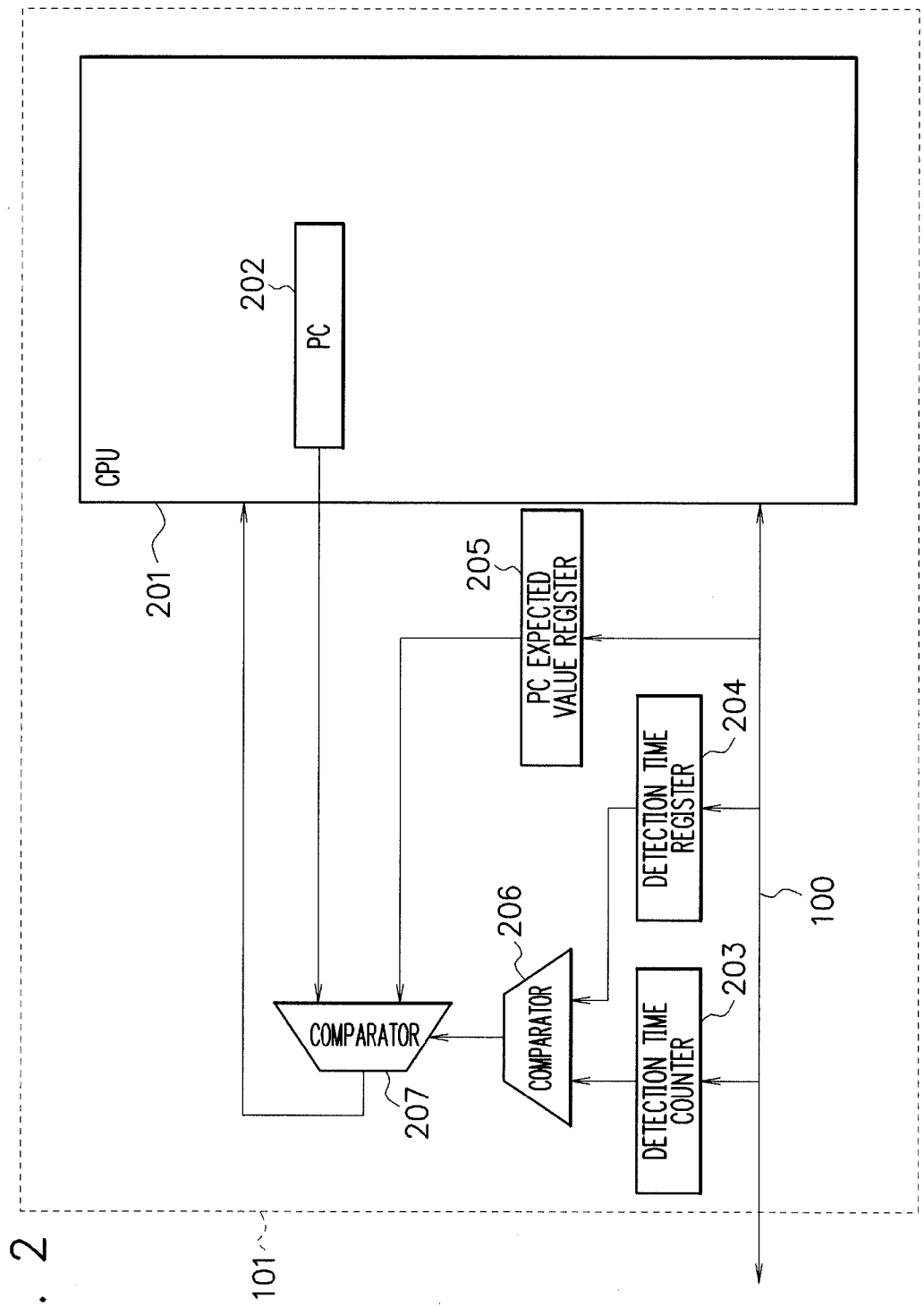
FIG. 2 is a block diagram illustrating a structural example of a microcomputer according to the first embodiment.

FIG. 2 is a block diagram illustrating a structural example of the microcomputer 101. The microcomputer 101 has a CPU (central processing unit) 201, a detection time counter 203, a detection time register 204, a program counter (PC) expected value register 205, a first comparator 207, and a second comparator 206. The CPU 201 has a program counter 202. The CPU 201, the detection time counter 203, the detection time register 204, and the program counter expected value register 205 are connected to the bus 100.

Each time an instruction of the program is executed, the program counter 202 updates and stores the address of an instruction of the program to be executed next. The CPU 201 executes instructions of the program at addresses stored in the program counter 202 in order. The program counter expected value register 205 stores an expected value of an address stored in the program counter 202. The detection time register 204 stores a detection time. The detection time counter 203 performs counting of the detection time. The second comparator 206 compares the detection time stored in the detection time register 204 with a count value of the detection time counter 203. When the second comparator 206 outputs a comparison result indicating a match between the detection time stored in the detection time register 204 and the count value of the detection time counter 203, the first comparator 207 outputs a result of comparison between the address stored in the program counter 202 and the expected value stored in the program counter expected value register 205 as a failure detection result to the CPU 201. When the first comparator 207 outputs a comparison result indicating inconsistency, the CPU 201 determines that a failure of the CPU 201 is detected and performs failure countermeasure processing.

Figure 3:
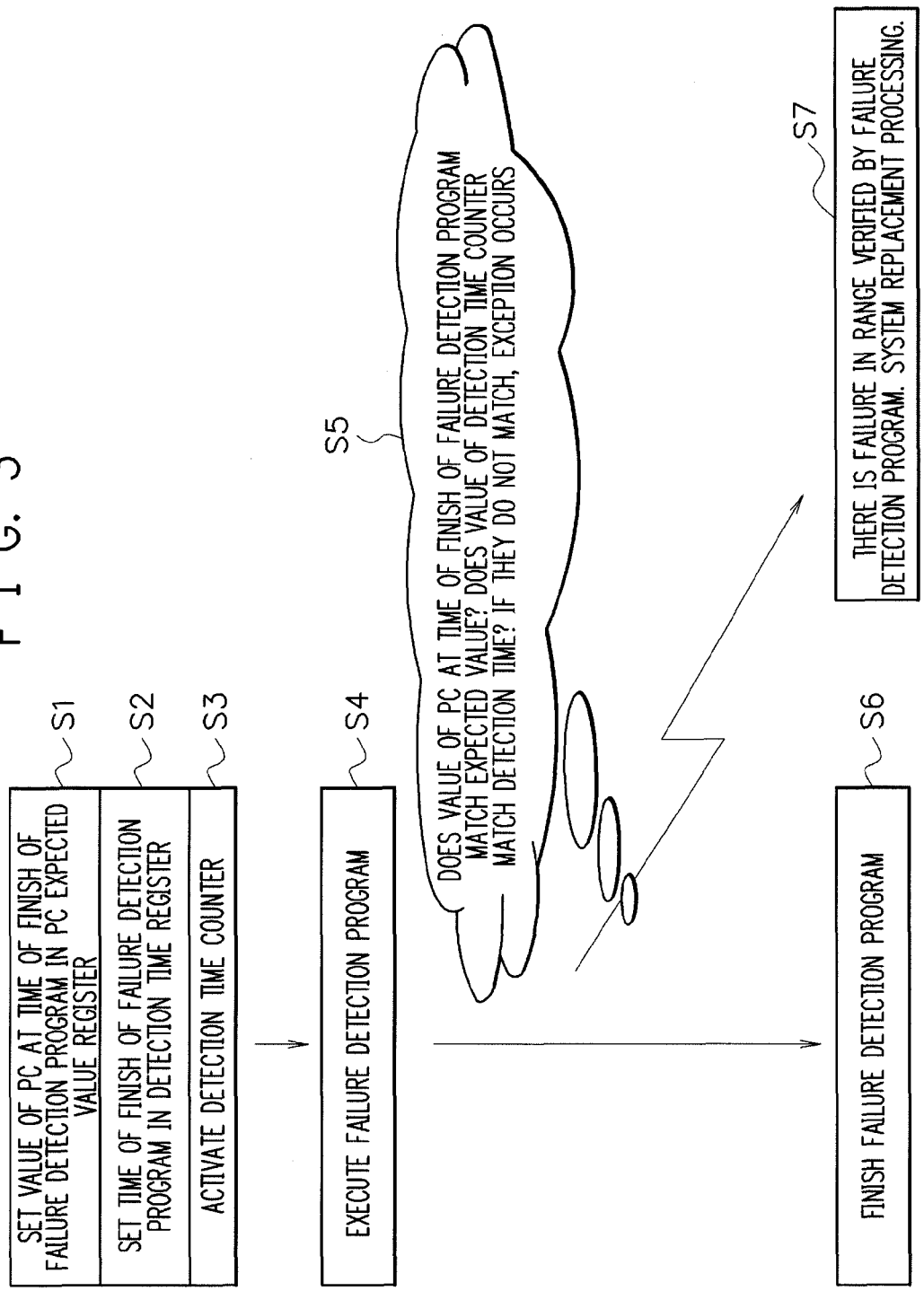
FIG. 3 is a flowchart illustrating a processing example of the microcomputer.
Figure 4:
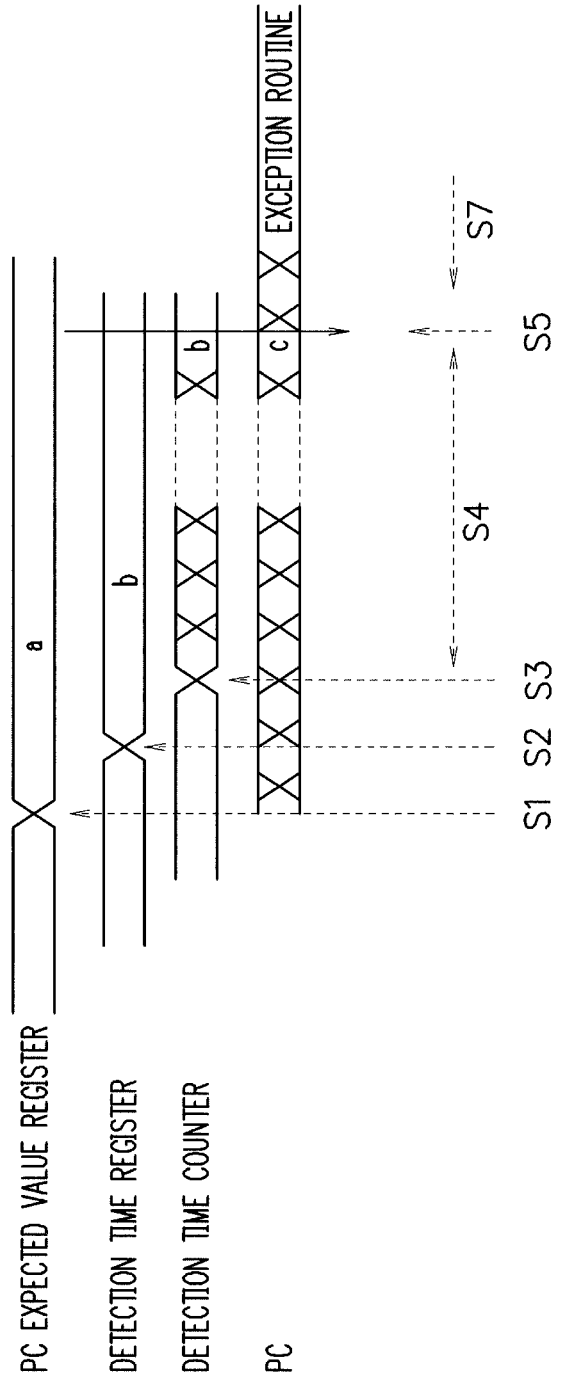
FIG. 4 is a timing chart illustrating a processing example of the flowchart of FIG. 3.

FIG. 3 is a flowchart illustrating a processing example of the microcomputer 101, and FIG. 4 is a timing chart illustrating a processing example of the flowchart of FIG. 3. When the CPU 201 executes the failure detection program in the ROM 104 or the RAM 105, the CPU performs processing of the flowchart of FIG. 3 according to the failure detection program. Steps S1 to S3 form a preprocessing part of the failure detection program. Step S4 forms a main part of the failure detection program. Steps S6 and S7 form a post-processing part of the failure detection program. The failure detection program has the preprocessing part, the main part, and the post-processing part as described above.

In step S1, the CPU 201 sets and stores in the program counter expected value register 205 an expected value of an address which is stored in the program counter 202 after the detection time passes from the start of execution of the failure detection program. For example, the above-described expected value is an expected value of an address which is stored in the program counter 202 at the time when the main part of the failure detection program finishes. In step S1 of FIG. 4, for example, "a" is stored as the expected value of the address in the program counter expected value register 205.

Next, in step S2, the CPU 201 stores the above-described detection time in the detection time register 204. For example, the detection time is a time taken from the start of execution of the main part of the failure detection program to the finish of the main part, and is expressed as a clock number. That is, the time when the main part of the detection failure program finishes is stored in the detection time register 204, and the expected value of the address which is stored in the program counter 202 at the time when the main part of the failure detection program finishes is stored in the program counter expected value register 205. When the CPU 201 executes the failure detection program normally, the address of the expected value in the program counter expected value register 205 is stored in the program counter 202 when the detection time in the detection time register 204 passes. By verifying this, a failure of the CPU 201 can be detected. In step S2 of FIG. 4, for example, "b" is stored as the detection time in the detection time register 204.

Next, in step S3, the CPU 201 causes the detection time counter 203 to start counting of the above-described detection time. Specifically, the CPU 201 causes the detection time counter 203 to start up counting from 0 (zero). The detection time counter 203 starts up counting from 0 and increases the count value as the time passes. In step S3 of FIG. 4, the detection time counter 203 starts up counting from 0.

Next, in step S4, the CPU 201 executes the main part of the failure detection program. For example, the main part of the failure detection program is a program performing arithmetic processing. In step S6 after the finish of the main part of the failure detection program, the CPU 201 is able to detect a failure of the CPU 201 by verifying whether the comparison result thereof is correct or wrong. In step S4 of FIG. 4, processing of the main part of the failure detection program is performed in a period from the finish of step S3 to the start of step S5.

Next, in step S5, the count value of the detection time counter 203 increases, and the count value of the detection time counter 203 and the detection time stored in the detection time register 204 match in a short time. The second comparator 206 compares the detection time stored in the detection time register 204 with the count value of the detection time counter 203, and when the detection time and the count value match, the second comparator outputs a comparison result indicating a match to the first comparator 207. When the second comparator 206 outputs the comparison result indicating a match between the detection time stored in the detection time register 204 and the count value of the detection time counter 203, the first comparator 207 outputs a result of comparison between the address stored in the program counter 202 and the expected value stored in the program counter expected value register 205 as a failure detection result to the CPU 201.

In step S5 of FIG. 4, the count value of the detection time counter 203 becomes the same value as the detection time "b" stored in the detection time register 204. At this time, the address stored in the program counter 202 is "c" for example, which is a value different from the expected value "a" stored in the program counter expected value register 205. As a result, the first comparator 207 outputs an inconsistency signal.

The CPU 201 proceeds to step S6 when a match signal is inputted as the failure detection result from the first comparator 207, or proceeds to step S7 when the inconsistency signal is inputted as the failure detection result from the first comparator 207.

In step S6, the CPU 201 determines that no failure of the CPU 201 is detected and finishes the failure detection program.

In step S7, the CPU 201 determines that a failure of the CPU 201 is detected, and executes failure countermeasure processing (processing program responding to a failure) as an exception handling routine. For example, in the failure countermeasure processing, the processing of the CPU 201 is stopped, and the CPU in the other CPU board 107 is allowed to perform processing instead. Further, the failure countermeasure processing is processing of finishing operation of the entire microcomputer system safely, processing of allowing traveling safely with limited functions, or the like. In step S7 of FIG. 4, the inconsistency signal is inputted from the first comparator 207 to the CPU 201, and then the CPU performs the failure countermeasure processing as the exception routine.

In addition, the inconsistency output signal of the first comparator 207 may be inputted to the CPU in the other CPU board 107, thereby allowing this CPU to perform the failure countermeasure processing as the exception routine.

FIG. 5 is a block diagram illustrating a structural example of a microcomputer 101 according to a second embodiment. The microcomputer 101 of this embodiment (FIG. 5) is made by deleting the detection time register 204 and the second comparator 206 from the microcomputer 101 of the first embodiment (FIG. 2). Differences of this embodiment from the first embodiment will be described below.

In this embodiment, step S2 of FIG. 3 is deleted. In step S3 of FIG. 3, when instructed by the CPU 201 to start counting, the detection time counter 203 starts down counting of a count value. By the down counting, the count value of the detection time counter 203 decreases as the time passes. Specifically, when the CPU 201 executes the failure detection program, the CPU causes the detection time counter 203 to start down counting from the above-described detection time. For example, in FIG. 4, the CPU causes the detection time counter to start down counting from the detection time "b". In step S5 of FIG. 3, when the count value of the detection time counter 203 becomes 0, the first comparator 207 outputs as a failure detection result a result of comparison between the address stored in the program counter 202 and the expected value stored in the program counter expected value register 205.

The CPU 201 proceeds to step S6 when a match signal is inputted as the failure detection result from the first comparator 207, or proceeds to step S7 when the inconsistency signal is inputted as the failure detection result from the first comparator 207. Processing in steps S6 and S7 is the same as that in the first embodiment.

As has been described, according to the first embodiment and the second embodiment, the first comparator 207 compares the address stored in the program counter 202 with the expected value stored in the program counter expected value register 205. The detection time counter 203 performs counting of the detection time. Specifically, when the CPU 201 executes the failure detection program, the CPU causes the program counter expected value register 205 to store the expected value of the address which is stored in the program counter 202 after the detection time passes from the start of execution of the failure detection program, and causes the detection time counter 203 to start counting of the above-described detection time. In the first embodiment, the detection time counter 203 performs up counting, and in the second embodiment, the detection time counter 203 performs down counting. When the detection time counter 203 finishes counting of the above-described detection time, the first comparator 207 outputs as the failure detection result a result of comparison between the address stored in the program counter 202 and the expected value stored in the program counter expected value register 205.

As described above, the failure detection program detects a failure of the CPU 201. The expected value of the program counter 202 when the failure detection program is executed and the detection time at which this expected value is scheduled to appear are set in advance. At this scheduled detection time, the expected value of the program counter 202 and the value of the program counter 202 are compared. When these values do not match, a failure of the CPU 201 is detected.

According to the first and second embodiments, it is possible to directly test flow control of instructions of a program, and thus a failure of a circuit controlling instruction flow of the program can be detected.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

It is possible to directly test flow control of instructions of a program, and thus a failure of a circuit controlling instruction flow of the program can be detected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A microcomputer, comprising:
a CPU including a program counter which updates and stores an address of an instruction of a program to be executed next when an instruction of the program is executed, the CPU configured to execute instructions of the program of which addresses stored in the program counter in order;
a program counter expected value register which stores an expected value of an address to be stored in the program counter;
a first comparator which compares the address stored in the program counter with the expected value stored in the program counter expected value register; and
a detection time counter which counts a detection time,
wherein when the CPU executes a failure detection program, the CPU causes the program counter expected value register to store the expected value of the address which is stored in the program counter after the detection time passes from the start of execution of the failure detection program, and causes the detection time counter to start counting of the detection time, and
wherein when the detection time counter finishes counting of the detection time, the first comparator outputs as a failure detection result a result of comparison between the address stored in the program counter and the expected value stored in the program counter expected value register.

2. The microcomputer according to claim 1,
wherein when the first comparator outputs a comparison result indicating inconsistency, the CPU determines that a failure of the CPU is detected and performs failure countermeasure processing.

3. The microcomputer according to claim 1, further comprising:
a detection time register which stores a detection time; and
a second comparator which compares the detection time stored in the detection time register with a count value of the detection time counter,
wherein when instructed by the CPU to start counting, the detection time counter starts up counting of a count value,
wherein when the CPU executes the failure detection program, the CPU causes the detection time register to store the detection time, and
wherein when the second comparator outputs a comparison result indicating a match between the detection time stored in the detection time register and the count value of the detection time counter, the first comparator outputs as a failure detection result a result of comparison between the address stored in the program counter and the expected value stored in the program counter expected value register.

4. The microcomputer according to claim 3,
wherein when the CPU executes the failure detection program, the CPU causes the detection time counter to start up counting from 0 (zero).

5. The microcomputer according to claim 1,
wherein when instructed by the CPU to start counting, the detection time counter starts down counting of a count value.

6. The microcomputer according to claim 5,
wherein when the CPU executes the failure detection program, the CPU causes the detection time counter to start down counting from the detection time, and
wherein when the count value of the detection time counter becomes 0 (zero), the first comparator outputs as a failure detection result a result of comparison between the address stored in the program counter and the expected value stored in the program counter expected value register.

* * * * *